(12) United States Patent
Ansari et al.

(10) Patent No.: US 11,051,311 B2
(45) Date of Patent: Jun. 29, 2021

(54) TECHNIQUE FOR ACCESSING A WIRELESS CHANNEL IN COEXISTENCE SCNARIOS

(71) Applicant: Telefonaktiebolaget LM Ericsson (publ), Stockholm (SE)

(72) Inventors: Junaid Ansari, Fürt (DE); Reem Karaki, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 16 days.

(21) Appl. No.: 16/080,069

(22) PCT Filed: Feb. 28, 2017

(86) PCT No.: PCT/EP2017/054660
§ 371 (c)(1),
(2) Date: Aug. 27, 2018

(87) PCT Pub. No.: WO2017/148956
PCT Pub. Date: Sep. 8, 2017

(65) Prior Publication Data
US 2019/0090245 A1    Mar. 21, 2019

Related U.S. Application Data

(60) Provisional application No. 62/301,010, filed on Feb. 29, 2016.

(51) Int. Cl.
*H04W 72/04* (2009.01)
*H04W 74/08* (2009.01)
(Continued)

(52) U.S. Cl.
CPC ... *H04W 72/0486* (2013.01); *H04W 28/0236* (2013.01); *H04W 72/0446* (2013.01);
(Continued)

(58) Field of Classification Search
None
See application file for complete search history.

(56) References Cited

U.S. PATENT DOCUMENTS

2010/0008230 A1\* 1/2010 Khandekar ........... H04W 72/02
370/237
2010/0098008 A1\* 4/2010 Ishii ..................... H04W 72/06
370/329
(Continued)

OTHER PUBLICATIONS

ZTE, "UL framework for LAA", 3GPP TSG RAN WG1 Meeting #82bis, Malmo, Sweden, Oct. 4, 2015, pp. 1-6, R1-155245, 3GPP.
(Continued)

*Primary Examiner* — Jenkey Van
(74) *Attorney, Agent, or Firm* — Coats & Bennett, PLLC

(57) ABSTRACT

A technique for accessing a wireless channel by a station using an access technology in coexistence with the same or another access technology on the wireless channel is described. As to a method aspect, resources (302) on the wireless channel are allocated or an allocation (300) therefor is received at the station. The allocation is not uniquely associated with data to be transmitted by the station on the wireless channel. If data to be transmitted by the station on the wireless channel is available, a listen before talk (LBT) process is performed on the wireless channel or transmission is deferred to satisfy a time-averaged transmit constraint. The data is transmitted by the station using at least one of the allocated resources (302) on the wireless channel, if the LBT process indicates that the wireless channel is clear for the at least one allocated resource (302) or if the time-averaged transmit constraint is satisfied for the at least one allocated resource (302).

24 Claims, 6 Drawing Sheets

(51) Int. Cl.
*H04W 28/02* (2009.01)
*H04W 72/08* (2009.01)
*H04W 16/14* (2009.01)

(52) U.S. Cl.
CPC ..... *H04W 72/082* (2013.01); *H04W 74/0808* (2013.01); *H04W 74/0833* (2013.01); *H04W 16/14* (2013.01); *H04W 72/04* (2013.01); *H04W 74/085* (2013.01)

(56) References Cited

U.S. PATENT DOCUMENTS

| | | | | |
|---|---|---|---|---|
| 2012/0170498 | A1* | 7/2012 | Gustavsson | H04W 52/40 |
| | | | | 370/311 |
| 2015/0131536 | A1 | 5/2015 | Kaur et al. | |
| 2015/0382375 | A1* | 12/2015 | Bhushan | H04W 72/1289 |
| | | | | 370/252 |
| 2016/0050094 | A1* | 2/2016 | Ryu | H04B 7/068 |
| | | | | 370/329 |
| 2016/0323914 | A1* | 11/2016 | Au | H04W 72/1236 |
| 2017/0048722 | A1* | 2/2017 | Van Phan | H04W 16/16 |
| 2017/0230984 | A1* | 8/2017 | Wang Helmersson | |
| | | | | H04W 72/1231 |
| 2018/0270803 | A1* | 9/2018 | Kwak | H04W 56/00 |
| 2018/0359772 | A1* | 12/2018 | Park | H04W 16/14 |
| 2019/0013883 | A1* | 1/2019 | Tercero Vargas | H04W 72/085 |
| 2019/0014596 | A1* | 1/2019 | Yang | H04W 72/1284 |

OTHER PUBLICATIONS

Qualcomm Incorporated, "Control details for UL in LAA", 3GPP TSG RAN WG1 #84, St. Julian's, Malta, Feb. 14, 2016, pp. 1-5, R1-160885, 3GPP.

3rd Generation Partnership Project, "3rd Generation Partnership Project; Technical Specification Group Radio Access Network; Evolved Universal Terrestrial Radio Access (E-UTRA); Physical channels and modulation (Release 11)", Technical Specification, 3GPP TS 36.211 V11.4.0, Sep. 1, 2013, pp. 1-120, 3GPP, France.

3rd Generation Partnership Project, "3rd Generation Partnership Project; Technical Specification Group Radio Access Network; Evolved Universal Terrestrial Radio Access (E-UTRA); Physical layer procedures (Release 11)", Technical Specification, 3GPP TS 36.213 V11.4.0, Sep. 1, 2013, pp. 1-182, 3GPP, France.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 11)", Technical Specification, 3GPP TS 36.331 V11.5.0, Sep. 1, 2013, pp. 1-347, 3GPP, France.

Afrin, N. et al., "Design of a Buffer and Channel Adaptive LTE Semi-Persistent Scheduler for M2M Communications", 2015 IEEE International Conference on Communications (ICC), Jun. 8, 2015, pp. 5821-5826, IEEE.

* cited by examiner

TECHNIQUE FOR ACCESSING A WIRELESS CHANNEL IN COEXISTENCE SCNARIOS

TECHNICAL FIELD

The present disclosure generally relates to a technique for accessing a wireless channel with coexisting access technologies on the channel. More specifically, and without limitation, methods and devices are provided for accessing a wireless channel by a station using an access technology in coexistence with the same or another access technology on the wireless channel.

BACKGROUND

3GPP Long Term Evolution (LTE) has primarily been designed for licensed spectrum in which case a base station (i.e., an evolved Node B or eNB) has full control of managing channel access and resource management. With operation of LTE in the unlicensed spectrum, regional regulations such as a requirement for performing channel sensing by each transmitting entity has to be respected where applicable (e.g., depending on the unlicensed frequency spectra or transmit power). Such requirements may include a "Listen Before Talk" (LBT) process. Moreover, regulations for maximum contiguous channel occupation and radio duty cycle limitations may have to be also fulfilled.

Due to the LBT process, the channel access is non-deterministic and depends upon the availability of the channel as well as the state of a backoff mechanism. In particular, for the LTE UL channel access, both UE and eNB need to perform LBT operations for each of a scheduling request, a scheduling grant and data transmission phases. Acknowledgment transmission may fall under a special regulatory case of control frame transmission, in which case a relatively faster CCA operation is allowed.

In contrast, Wi-Fi terminals according to the standard family IEEE 802.11 only need to compete once in the UL data transmission phase. Moreover, the Wi-Fi terminals can send data asynchronously compared to the synchronized LTE radio access network. Thus, Wi-Fi terminals have an inherent advantage over LTE terminals in UL data transmission and may show superior performance in some collocated deployment scenarios.

Studies indicate that, as the congestion in the network increases, TDMA type of access (as in LTE) starts to become efficient, whereas in low-load conditions, contention-based access (as in Wi-Fi) remains more efficient. Comprehensive system level performance evaluation studies indicate that in lightly loaded conditions, and when the congestion in the network is low, Wi-Fi achieves efficient performance characteristics, while LTE has benefits in congested and heavily loaded traffic conditions. One of the shortcomings with conventional LTE operation in coexistence scenarios under lightly loaded and less congested network conditions comes from its TDMA type of medium access.

SUMMARY

Accordingly, there is a need for a technique that allows access technologies with TDMA aspects to coexist with same or other access technologies in unlicensed spectrum.

As to one aspect, a method of accessing a wireless channel by a station using an access technology in coexistence with the same or another access technology on the wireless channel is provided. The method triggers or comprises a step of allocating resources on the wireless channel or receiving an allocation therefor, wherein the allocation is not uniquely associated with data to be transmitted by the station on the wireless channel; a step of performing a listen before talk (LBT) process on the wireless channel or deferring transmission to satisfy a time-averaged transmit constraint, if data to be transmitted by the station on the wireless channel is available; and a step of transmitting the data by the station using at least one of the allocated resources on the wireless channel, if the LBT process indicates that the wireless channel is clear for the at least one allocated resource or if the time-averaged transmit constraint is satisfied for the at least one allocated resource.

The station (e.g., the base station or a user equipment that performs the LBT process or the deferral and conditionally transmits the data) may determine if and/or which of the allocated resources is used for transmitting the data. A base station implementing the access technology may determine the resource allocation.

The term "deferring" may, e.g. in the context of LBT, refer to a waiting state (e.g., when the channel is found to be unavailable or when the channel is in congestion). The term is not limited to such a state, e.g., in the context of satisfying a time-averaged transmit constraint. By way of example, the step of deferring may include using a later resource for transmitting the data to satisfy the time-averaged transmit constraint At least some embodiments of the technique can be efficient (e.g., in lightly loaded and/or less congested network conditions) by giving the transmitting station the freedom to contend, if the station has data to be transmitted, within the allocated resources. The technique can be implemented to achieve flexible downlink and/or uplink scheduling for LTE in unlicensed spectrum. The technique can be implemented, e.g., on layer 1 (physical layer) and/or layer 2 (data link layer) of a protocol stack of the access technology.

The wireless channel may be "clear", if the resources on the wireless channel are free from transmissions by one or more external networks (e.g., implementing the same or the other access technology). By way of example, once the allocated resource has been identified and/or detected to be "clear", the access technology implemented by the station may use the resource in an access technology-specific way (e.g., regardless of the outcome of another LBT operation by another station), once the transmission is ongoing within an access network of the station. Moreover, the channel may be clear even though a transmission occurs on the same frequency, since the resource may be distinguished from the occurring transmission as a separate spatial stream. An example includes full-duplex radio communication (i.e., transmit and receive in the same frequency at the same time), e.g., by using multiple transmit antennas. The resources may include any allocatable portions of the wireless channel distinguished by at least one of time, frequency and spatial stream.

The wireless channel may encompass any channel using a wireless media, e.g., electromagnetic radiation. The wireless channel may be a radio channel and/or an infrared channel. The wireless channel may be a radio frequency channel. The wireless channel may use electromagnetic radiation at radio frequencies, e.g., in the range from 500 MHz to 100 GHz (e.g., in frequency bands at 700 MHz, 2.4 GHz, 3.6 GHz, 5 GHz, and 60 GHz) and/or infrared (IR) radiation. The radio channel may be a radio carrier or radio band. The radio channel may include a plurality of subcarriers. Each of the radio resources may include one or more timeslots, one or more subcarriers, one or more spatial streams, or a combination or sub-combination thereof.

The allocation may relate to a transmission opportunity on multiple radio resources and/or a transmission opportunity for multiple stations including the station (e.g., for multiple stations belonging to the radio access network of the station). The resources may be any portions (e.g., defined in terms of time and/or frequency) of the wireless channel. The access technology may be a radio access technology (RAT), e.g., 3GPP Long Term Evolution (LTE), LTE-Advanced, MulteFire or a Fifth Generation RAT.

The coexistence may be a potential coexistence. The term "coexistence" may relate to a function feature of the station. For example, the access technology may be implemented by the station so that the station is configured for the coexistence. The potentially coexisting same or other access technology is not necessarily a feature of the technology. The coexistence does, at least in some embodiments, not imply or require the factual coexistence, e.g., at a certain point in time. The potentially coexisting same or other access technology may be absent, e.g., because the station is (e.g., temporarily) sufficiently far away from another transmitting station, or because the other station is (e.g., temporarily) not transmitting.

The potentially coexisting same or other access technology may be implemented by another station. The other station may use the same wireless channel, e.g., intermittently. The other access technology may include Wi-Fi according to the standard family IEEE 802.11.

The allocation may not be uniquely associated with data to be transmitted by allocating the same resource to multiple stations (e.g., including the station). Alternatively or in addition, the allocation may not be uniquely associated with data to be transmitted by allocating multiple radio resources (e.g., multiple timeslots) to the station.

By way of example, the allocation may not be the result of a request triggered by the presence of data or an amount of data to be transmitted. Furthermore, the allocation may not be indicated in a grant that is based on the presence of data or an amount of data to be transmitted.

The time-averaged transmit constraint of the wireless channel may include at least one of a long-term sensed energy on the wireless channel, signal strength measures on the wireless channel and a duty cycle (e.g., including or defining on and off phases for transmission) on the wireless channel.

The station (e.g., a terminal device, such as a UE) may take its own decision whether or not to utilize (for transmission) a particular allocated resource (e.g., allocated by the base station). The step of performing LBT and/or deferring transmission may be part of a step of determining whether or not to use one or more of the allocated resources and/or which of the allocated resources are used for the transmission. The step of deciding may be performed locally, e.g., by and/or at the station. The local decision by stations (e.g., in the radio access network or cell of the base station) may be based on the LBT process, the long term sensed energy level comparison against a threshold, etc. The LBT process and the time-averaged transmit constraint (e.g., the long term sensed energy level and/or spectral interference conditions) may be alternatives, e.g., implemented in alternative embodiments or performed alternatively within one embodiment.

Some embodiments may always perform the LBT process before accessing (e.g., transmitting on) the wireless channel. At least some of such embodiments may be globally harmonized, i.e., comply with many different regional coexistence requirements. Furthermore, such embodiments may exhibit a superior performance compared to alternative embodiments not supporting LBT. Moreover, in such embodiments, the station may be systematically controlled (e.g., by a base station) through a backoff mechanism, so as to access the wireless channel at a particular time. In a variant, the LBT process may be performed for a preconfigured fraction of the transmissions.

In the alternative embodiments not performing LBT, the station may consume less power, may be more compact and/or may be more cost-effective. A base station may only control the number of stations (including the station) scheduled to transmit at a given time, e.g., based on the traffic loads, long term sensed energy, spectral interference conditions, reliability, etc.

The allocation may not be uniquely associated with data to be transmitted by allocating multiple resources to the same station. The resource allocation may overprovision the resources, e.g., as compared to an amount of the data that is subsequently transmitted. The data, the amount of data, and/or a traffic priority of the data to be transmitted may be unavailable at the time of the resource allocation.

Each of the resources may include one or more timeslots, one or more frequency channels or carriers, one or more spatial streams, or a combination thereof. The allocation of multiple resources may be an allocation according to a semi-persistent schedule (SPS). The semi-persistently scheduled resources may be periodic. While SPS may be primarily designed for licensed spectrum, unlicensed spectrum operation poses further problems including the unavailability of channel resources and collisions. The technique can be applied to include and modify SPS to accommodate the unlicensed spectrum. For example, the station may have autonomous control over the usage of the semi-persistently scheduled resources for contending on the wireless channel.

A periodicity and/or a duration of the semi-persistently scheduled radio resources may be equal to a transmission time interval of the access technology. The allocation may provide instant uplink access (IUA). The station may refrain from transmitting on the wireless channel, e.g., if the LBT is unsuccessful, if the time-averaged transmit constraint is not fulfilled, and/or if no data for transmission is available. Alternatively or in addition, the resources may be scheduled with a granularity (e.g., an SPS period) corresponding to a transmission time interval (TTI) of the access technology.

The allocation may be not uniquely associated with data to be transmitted by allocating the same resources to multiple stations including the station. Allocating the same resources to multiple stations may allow assigning many more stations in advance for a given number of resources, which may also be referred to as overbooking of the resource. Each of the multiple stations may use the same access technology, e.g., within the same radio access network. The multiple stations may contend for such resources by means of the LBT process.

The LBT process may include a clear channel assessment (CCA) and a backoff mechanism. Each LBT process may depend on a backoff counter (e.g. in the backoff mechanism). Different or identical backoff counters may be assigned (e.g., by a base station) to the multiple stations. The backoff counter assigned to the station may depend on a priority of the station.

The station may start performing the LBT process at a time prior to the radio time scheduled for the allocated resource. A lead-time for starting the LBT process may include a DCF Interframe Space, $T_{DIFS}$, and/or a backoff time, $T_{backoff}$, of the backoff mechanism, e.g., according to IEEE 802.11 specifications for Wi-Fi. Alternatively, LTE operation in unlicensed spectrum or licensed shared spectrum may apply a different Interframe Space and/or a different backoff time. If the CCA indicates that wireless channel is clear up until the scheduled radio time, the transmission may start at the scheduled radio time.

A number, a periodicity and/or a duration of the resources allocated to the station may depend on at least one of a priority of the station and a utility function of the wireless channel (or the specifically allocated resources thereon). The priority of the station may depend on a buffer status report (BSR) of the station.

The utility function may depend on multiple factors, e.g., one or more of the following dependencies. The utility function may depend on an inverse of interference power measured on the wireless channel and/or a signal cleanliness of the wireless channel. The utility function may depend on a reliability of the wireless channel and/or a packet reception ratio on the wireless channel. The utility function may depend on a channel utilization level of the wireless channel, a network utilization level of resources on the wireless channel allocated by a base station of the radio access network or a station utilization level of resources on the wireless channel previously allocated to the station. The utility function may depend on buffer status reports (BSRs) and/or a buffer build-up of multiple stations accessing the wireless channel according to the access technology. A buffer build-up may be inferred from multiple BSRs over a certain observed period of time. For instance, if the BSR from a station at time $t_k$ indicates a first value M, and the next BSR from the station at time $t_{k+1}$ indicates a second value N, N>M may indicate the presence of a buffer build-up at the station. The base station may observe the buffer build-up over multiple contiguous time points. The dependencies may be weighted and/or linearly combined in the utility function.

The same resources may be allocated to multiple stations including the station, if the utility function is below a first threshold. Alternatively or in combination, multiple resources may be allocated to the station, if the utility function is below a second threshold greater than the first threshold. For example, the multiple resources may be semi-persistently and exclusively scheduled to the station, if the utility function is above the first threshold and below the second threshold.

The method may be performed, if (e.g., as long as) the utility function is below the second threshold. The resources allocated to the station may be uniquely associated with data to be transmitted by the station on the wireless channel, if the utility function is above the second threshold.

The wireless channel may be in unlicensed spectrum. The method may be performed by a base station (e.g. for a downlink transmission) or a wireless station (e.g., for an uplink transmission). The base station may be a MulteFire station or an enhanced Node B (or eNB) for an LTE implementation. The wireless station may be at least one of a node, a mobile station, a portable station, a user equipment (UE) according to 3GPP, a wireless terminal or a machine-type station, e.g., for machine-type communication (MTC) or machine-to-machine (M2M) communication.

The step of allocating the radio resources may be triggered or implemented by receiving (e.g., at the wireless station) or sending (e.g., from the base station) an allocation message. Optionally, the method further comprises the step of sending or receiving a configuration message indicative of parameters of the semi-persistent schedule.

For the method being performed by a base station, the step of allocating the resources may include sending a downlink scheduling assignment. For the method being performed by a wireless station, the step of receiving the allocation may include receiving an uplink schedule grant.

Furthermore, the method may be performed by each of a base station implementing the access technology and a wireless station implementing the access technology, e.g., in the same access network. A backoff value for the LBT process at the wireless station may be greater than the backoff value for the LBT process at the base station.

As to another aspect, a method of conditionally performing scheduled-based access on a wireless channel by a station using an access technology in coexistence with the same or another access technology on the wireless channel is provided. The method comprises a step of evaluating a utility function for the wireless channel; and a step of allocating resources on the wireless channel or receiving an allocation therefor, wherein the allocation is not uniquely associated with data to be transmitted by the station on the wireless channel, if the utility function is less than a threshold, and/or wherein the allocation is uniquely associated with data to be transmitted by the station on the wireless channel, if the utility function is greater than the threshold.

The method of conditionally performing scheduled-based access may be implemented as a condition for performing the above method of accessing the wireless channel. The utility function may be implemented as described in the context of the above method of accessing the wireless channel.

As to a further aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., the access network and/or the Internet.

As to another aspect, a device for accessing a wireless channel by a station using an access technology in coexistence with the same or another access technology on the wireless channel is provided. The device may be configured to trigger or perform the steps of any of above method aspect. Alternatively or in addition, the device comprises an allocating unit configured to allocate resources on the wireless channel or to receive an allocation therefor, wherein the allocation is not uniquely associated with data to be transmitted by the station on the wireless channel; a listen before talk (LBT) unit configured to perform an LBT process on the wireless channel, if data to be transmitted by the station on the wireless channel is available, and/or a deferring unit configured to defer transmission to satisfy a time-averaged transmit constraint, if data to be transmitted by the station on the wireless channel is available; and a transmitting unit configured to transmit the data by the station using at least one of the allocated resources on the wireless channel, if the LBT process indicates that the wireless channel is clear for the at least one allocated resource or if the time-averaged transmit constraint is satisfied for the at least one allocated resource.

As to a still further aspect, a base station connected or connectable to a backhaul network of an access network of an access technology in coexistence with the same or another access technology on a wireless channel is provided. The base station comprises an allocation module for allocating resources on the wireless channel, wherein the allocation is not uniquely associated with data to be transmitted by the station on the wireless channel; an LBT module for performing a listen before talk (LBT) process on the wireless channel and/or a deferring module for deferring transmission to satisfy a time-averaged transmit constraint, if data to be transmitted by the station on the wireless channel is available; and a transmission module for transmitting the data by the station using at least one of the allocated resources on the wireless channel, if the LBT process indicates that the wireless channel is clear for the at least one allocated resource or if the time-averaged transmit constraint is satisfied for the at least one allocated resource.

As to a still further aspect, a wireless station wirelessly connected or connectable to an access network according to an access technology in coexistence with the same or another access technology on a wireless channel is provided. The wireless station comprises an allocation module for receiving an allocation of resources on the wireless channel, wherein the allocation is not uniquely associated with data to be transmitted by the station on the wireless channel; an LBT module for performing a listen before talk (LBT) process on the wireless channel and/or a deferring module for deferring transmission to satisfy a time-averaged transmit constraint, if data to be transmitted by the station on the wireless channel is available; and a transmission module for transmitting the data by the station using at least one of the allocated resources on the wireless channel, if the LBT process indicates that the wireless channel is clear for the at least one allocated resource or if the time-averaged transmit constraint is satisfied for the at least one allocated resource.

Any of the device, the base station and the wireless station may further comprise units or modules for performing any of the steps of the method aspect.

At least some of the advantageous embodiments are specified by the depending claims.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a Long Term Evolution (LTE) implementation in coexistence with a Wireless Local Area Network (WLAN or Wi-Fi) according to the standard family IEEE 802.11 (e.g., IEEE 802.11a, g, n or ac), it is readily apparent that the technique described herein may also be applied to the coexistence of multiple LTE networks in unlicensed spectrum or license shared spectrum, the coexistence of multiple Wi-Fi networks and/or in any other coexistence of wireless communication networks, e.g., including ZigBee based on the standard IEEE 802.15.4 and a Worldwide Interoperability for Microwave Access (WiMAX) according to the standard family IEEE 802.16.

Moreover, those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the services, functions, steps and implement the units disclosed herein.

Figure 1:
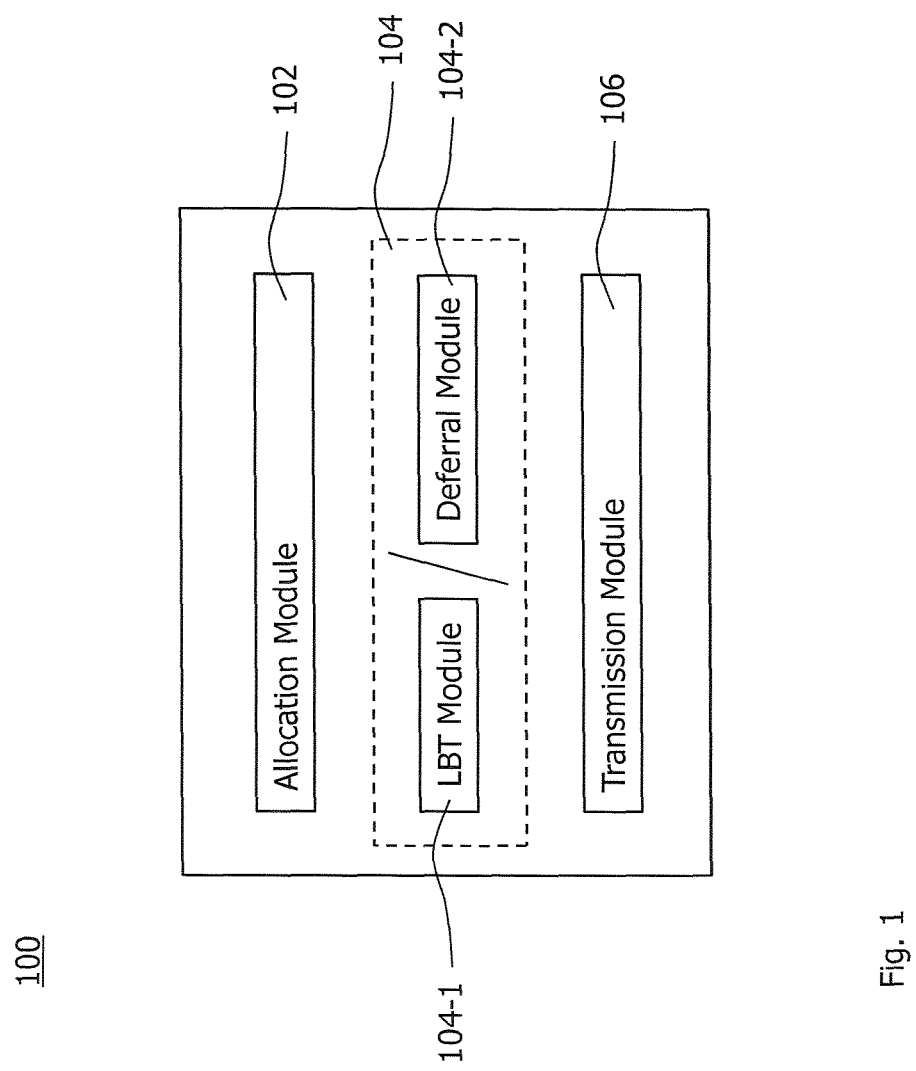
FIG. 1 shows a schematic block diagram for a first embodiment of a device for accessing a wireless channel by a station using an access technology in coexistence with the same or another access technology on the wireless channel.

FIG. 1 shows a schematic block diagram for a first embodiment of a device 100 for accessing a wireless channel by a station using an access technology in coexistence with the same or another access technology on the wireless channel. The device comprises an allocating module 102 for allocating resources on the wireless channel (e.g., if the device is implemented at a base station as the station) or receiving an allocation therefor (e.g., if the device is implemented at a base station as the station). The allocation is not uniquely associated with data to be transmitted by the station on the wireless channel.

The device 100 further comprises an access module 104 for accessing the wireless channel under coexistence. The access module is implemented to include at least one of a listen before talk (LBT) module 104-1 for performing an LBT process on the wireless channel and a deferral module 104-2 for deferring transmission to satisfy a time-averaged transmit constraint. At least one of the modules 104-1 and 104-2 is executed, if data to be transmitted by the station on the wireless channel is available.

The device 100 further comprises a transmission module 106 for transmitting the data by the station using at least one of the allocated resources on the wireless channel. The transmission is subject to the condition that the wireless channel is clear (e.g., for the at least one allocated resource) according to the LBT process or that the time-averaged transmit constraint is satisfied on the wireless channel (e.g., for the at least one allocated resource).

Figure 2:
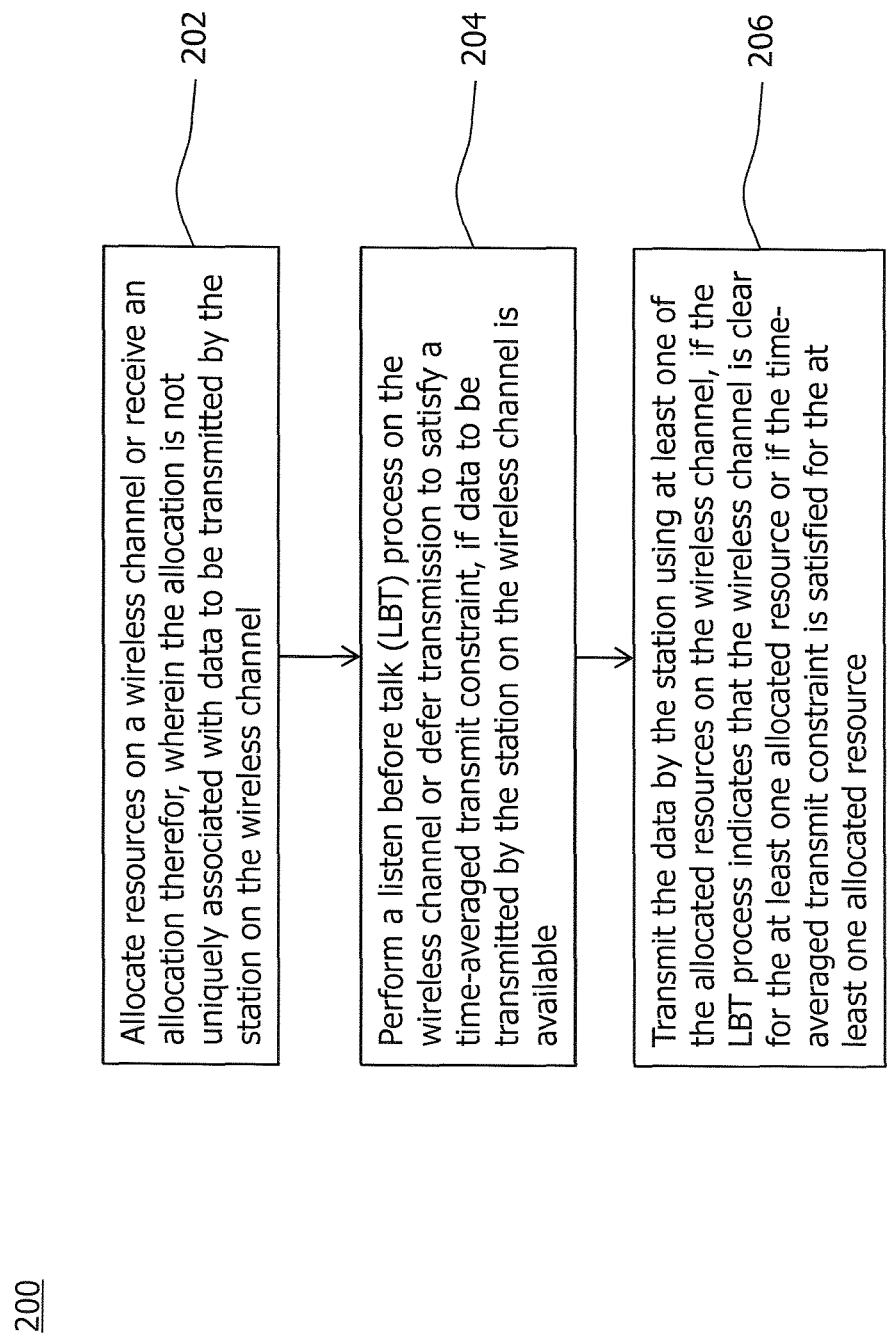
FIG. 2 shows a flowchart for an implementation of a method of accessing a wireless channel by a station using an access technology in coexistence with the same or another access technology on the wireless channel, which is implementable by the device of FIG. 1.

FIG. 2 shows a flowchart for an implementation of a method 200 of accessing a wireless channel by a station using an access technology in coexistence with the same or another access technology on the wireless channel. The method 200 comprises a step 202 of allocating resources on the wireless channel or receiving an allocation therefor, wherein the allocation is not uniquely associated with data to be transmitted by the station on the wireless channel; a step 204 of performing a listen before talk (LBT) process on the wireless channel or deferring transmission to satisfy a time-averaged transmit constraint, if data to be transmitted by the station on the wireless channel is available; and a step 206 of transmitting the data by the station using at least one of the allocated resources on the wireless channel, if the LBT process indicates that the wireless channel is clear for the at least one allocated resource or if the time-averaged transmit constraint is satisfied for the at least one allocated resource.

The method 200 may be performed by the device 100. More specifically, the modules 102, 104 and 106 may perform the steps 202, 204 and 206, respectively.

The device may be implemented in, and/or collocated with, the station. The station may be part of a radio access network, e.g., as a base station or as one of multiple wireless stations. The wireless channel may use (partly or completely) unlicensed spectrum or any spectrum shared according to a coexistence mechanism (e.g., using the LBT process or the time-averaged transmit constraint).

This technique enhances channel efficiency (e.g., LTE uplink efficiency) by allowing prior allocation (or reservation) of the resources in the step 202. Optionally, the allocation 202 depends on a state of the wireless channel. E.g., the allocation of the resources adapts to traffic conditions, number of stations (e.g., terminals) in the radio access network, congestion in the radio access network and/or availability of channel resources.

Furthermore, the allocation may be semi-persistently scheduled (SPS). An SPS configuration in unlicensed spectrum may be based on a utility function. Moreover, the technique can be implemented to tradeoff (e.g., in an LTE radio access network) contention-based channel access and schedule-based access to achieve high efficiency in different traffic conditions and/or for different availability of channel resources. Different embodiments may implement different possibilities to enhance the uplink (UL) transmission of LTE in unlicensed and license shared spectrum.

LTE is an example for a scheduled radio access technology. UL transmissions are controlled by the base station (e.g., an evolved NodeB or eNB in LTE) such that no transmission by any station (e.g., a User Equipment or UE in LTE) occurs unless it is granted and permitted by the base station. Furthermore, the grants for scheduled UL transmissions by the base station are valid only for a specific time interval. The scheduling information in the UL grant is conveyed in a downlink control channel. Upon reception of the grant, the UE as an example for the station is permitted to transmit after 4 subframes for a duration with 1 ms of granularity (being the LTE scheduling unit).

In LTE License Assisted Access (LAA), a Secondary Cell (SCell) operates in the unlicensed spectrum (in addition to a Primary Cell providing control signaling such as the grant). The transmissions in the unlicensed spectrum are subject to a coexistence mechanism (which is also referred to as regulations), e.g., listen before talk as specified in 3GGP LTE Release 13.

According to the regulations, a conventional uplink transmission is subjected to two LBT operations, one done by the eNB and the other by the UE. The procedure causes latency due to the transmission of scheduling resource, grant reception and processing.

On the other hand, Wi-Fi operates asynchronously and autonomously. The stations are not restricted by grants or assignments for transmissions at specific intervals. This allows a Wi-Fi station more flexibility in contending for the channel and acquiring it for transmission access.

At low load conditions on the wireless channel (e.g., when latency matters the most), the uplink access of Wi-Fi might result in a better performance as compared to LTE. This observation can be due to the autonomous and asynchronous nature of medium access in Wi-Fi which readily allows to utilize the resources. LTE UEs have to wait for their schedule assigned by the base station, and traditionally this is acquired only after having an explicit handshake including schedule request and schedule grant.

At high load conditions on the wireless channel (e.g., when a large number of stations would have to contend in order to access the wireless channel), Wi-Fi might be less efficient due to the high number of potential collisions and the station going into a deferral state, which lowers the utilization of radio resources. This behavior has been observed in simulation studies.

The technique can be implemented to ensure efficient performance of an LTE radio access network in unlicensed spectrum or license shared spectrum at any load situation.

The allocation of resources may depend upon at least one of a number of UEs potentially connected (or needing to transmit data), traffic priority levels, congestion and (e.g., external) interference in the radio access network as well as the potential availability of radio resources. Preferably, the resource allocation is not exclusively based on the traffic load itself. The resource allocation may be based on a more comprehensive utility function to cover other of the above-mentioned factors. In licensed spectrum, the use of SPS or schedule-based access may be based just on the load condition. In unlicensed spectrum, it is important to additionally include other factors as described herein.

Figure 3:
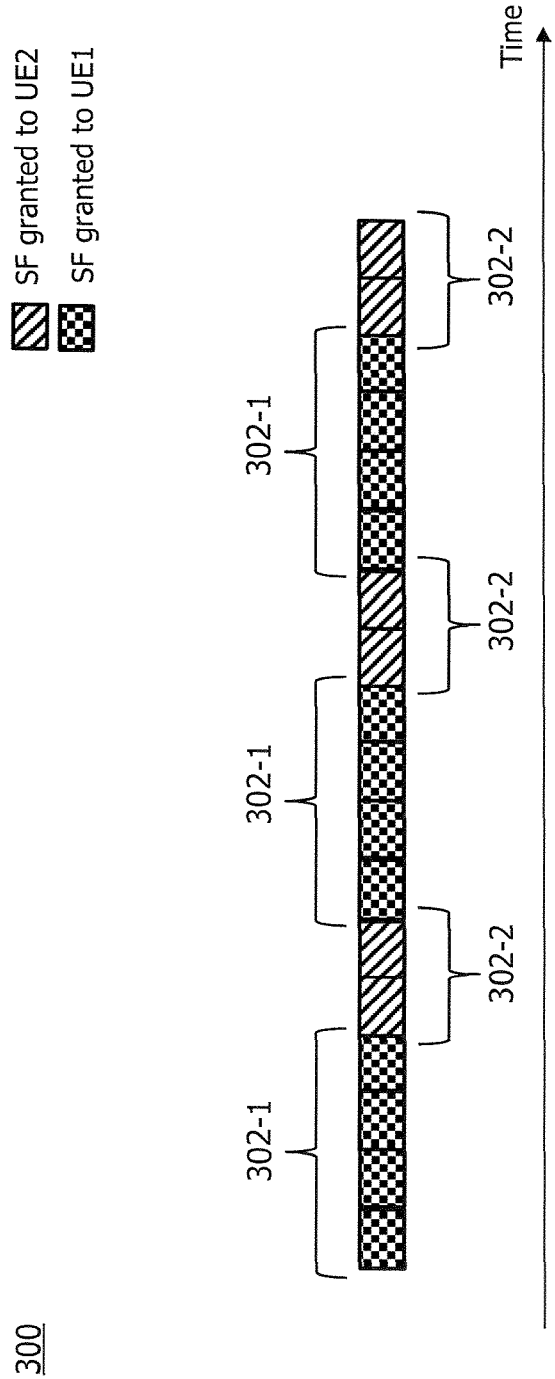
FIG. 3 shows a first example for an allocation of resources.

FIG. 3 shows a first example for an allocation 300 of radio resources 302. The allocation is an example for an UL access scheme at low load.

In semi-persistent scheduling (SPS), the UE is granted radio resources periodically without explicit grant signal sent every time the UE is granted the resources. The eNB sends a long lasting grant that allows the UE (e.g., the UE modem) to keep track on when it is granted resources and use the granted time and/or frequency slot for transmitting the data in the step 206. A duration of the long lasting grant may depend upon the dynamics in the spectrum and/or changing traffic characteristics as to load and/or priority.

In a variant, Instant Uplink Access (IUA) may further be implemented for latency reduction. IUA is a form of pre-scheduling that allows transmission of data without explicit scheduling requests (SRs). IUA may be implemented as an enhancement of the (SPS) framework by requiring the UE to not transmit using the grant unless there is data to be transmitted (e.g., in buffer) according to the steps 204 and 206. The (e.g., smallest) SPS periodicity may equal 1 subframe or a transmission time interval (TTI) of the access technology.

SPS grant transmission allows the UE modem to be granted radio resources periodically. By implementing SPS in unlicensed spectrum, latency can be significantly reduced. SPS may also allow the LTE network in the unlicensed spectrum to utilize the medium more effectively and improve the uplink (UL) transmission. This in turn gives UEs more freedom to carry out UL transmissions and make up for the shortcoming of conventional LTE UL (as observed through simulation studies). In particular, the technique can be implemented so that UEs (as examples for the station) carryout autonomous transmissions that can fairly contend with those of Wi-Fi stations. Moreover, having UEs given UL grants in a controlled manner allows minimizing self-deferral problem, as is the case in Wi-Fi.

Unlike a conventional use of SPS in licensed spectrum operation, the conditional non-unique resource allocation (e.g., by allocating "overbooked" resources, or not, or exercising schedule-based access and dynamic decisions on therein) makes an LTE network to contend more effectively for the medium, and to utilize the medium more efficiently. Such aspects have not been considered for conventional use of SPS, and/or dynamic scheduling.

The SPS may be configured more aggressively (e.g., by reducing the periodicity or increasing a duration or duty factor of the scheduled timeslots) in unlicensed spectrum (e.g., unlike SPS implementations in licensed spectrum). As a result, the UE is given more flexibility as the availability of the wireless channel is not guaranteed and collisions might happen. For example, the SPS periodicity may be reduced and/or the duration or duty factor may be increased as a function of time.

The SPS grant with a reduced or smallest SPS periodicity (e.g., 1 ms, 2 ms or 10 ms) may be based on enhancements to 3GPP Release 13 or 14. The UE (as an example for the station) is configured to transmit UL data in every subframe in the step 206, if it succeeds in performing the LBT process in the step 204. In a variant or enhancement of conventional SPS, the UE does not need to transmit padding bits, if it does not have data. Hereby, it can give chance for other (coexisting) stations to access the wireless channel.

Since the UE can transmit uplink data in every subframe, it can compete with the downlink (DL) transmission of the serving cell. To overcome that, the UL transmission can be down-prioritized compared to the DL transmission, e.g., by assigning a higher backoff value for the UL transmission (for contention based access when using LBT).

Alternatively or in addition, different priorities are assigned to different stations (e.g., different UEs) depending on a utility function of the wireless channel (e.g., a traffic class or other criteria) and/or the specific station (e.g., number of collisions, traffic status, etc.). Based on the priority or utility function, the base station (e.g., the eNB) may allocate different numbers of resources and/or different periodicities for different UEs. Furthermore, the allocation may change during the operation.

SPS can be very effective at low loads. In one embodiment, the eNB schedules the same subframe to multiple stations (in the step 202) and lets them contend to access the subframe (in the step 204). As the traffic load increases, the eNB cannot afford this type of scheme as it may potentially lead to an increased number of collisions. The eNB determines when to activate the SPS for the allocation (also referred to as grant scheme) and when to deactivate it, e.g., based on the utility function of the wireless channel. The utility function may estimate a load situation in the cell (also referred to as state of the wireless channel).

Figure 5:
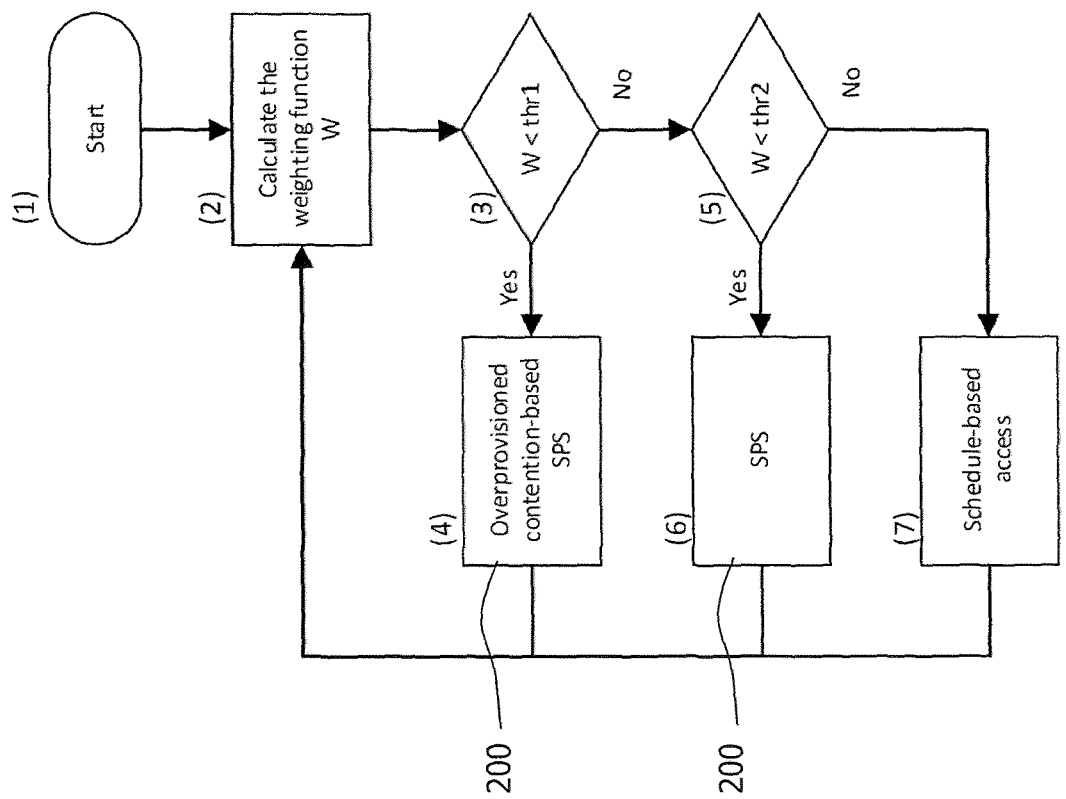
FIG. 5 shows a flowchart for a method of conditionally performing schedule-based access, which is implementable by the device of FIG. 1.

A criterion for SPS configuration (e.g., including activation and deactivation of SPS) may be extended to include other metrics (e.g. according to FIG. 5). The SPS according to 3GPP Release 13 is implemented in licensed spectrum in which access behavior and availability is guaranteed, and there is no external interference or need for coexistence. In unlicensed spectrum, the availability of the resources and channel access is not guaranteed due to potential occupancy by collocated radio access networks. Moreover, packet collisions could take place in unlicensed spectrum due to the use of non-deterministic access schemes. Depending on region and/or jurisdiction, a coexistence mechanisms can be a mandatory requirement according to regulations for the unlicensed spectrum. The coexistence mechanism may include the use of LBT-based non-deterministic schemes, for instance.

The configuration of SPS may be modified (compared to existing implementations in licensed spectrum) for channel efficiency in unlicensed spectrum. Optional configurable parameters for the SPS configuration are described below.

Alternatively or in addition, when the resources are allocated according to the SPS in the step 202, the step 204 may be implemented by spectrum sensing, interference assessment and/or the LBT process. Moreover, the use of SPS and its configuration may be evaluated more aggressively in unlicensed spectrum.

The eNB may start to give different priorities to different users, depending on the utility function. The eNB can adapt the number of allocated resources and/or the periodicity of the allocated resources for different UEs to reduce the contention for the same resources. The temporal order in which resources 302 are allocated to different users may be carried out according to the priority (e.g., of the UE and/or data at the corresponding UE).

FIG. 3 shows a non-limiting example of allocating different SPS periodicities or durations 302-1 and 302-2 to different UEs. The allocation may depend on their buffer status reports (BSRs). UE1 and UE2 report their BSRs to the serving eNB. The eNB notices that UE1 has more buffered data than UE2 and, therefore, allocates a greater number of resource elements in order to facilitate UE1 to empty its buffer faster.

In the example illustrated in FIG. 3, 4 uplink subframes (SFs) every 6 ms are allocated UE1 (as an example for the station in the step 202), and 2 SFs every 6 ms are allocated to UE2 (as another example for the station in the step 202).

Conventional LTE uplink transmission needs to undergo two LBT operations in unlicensed spectrum, one by the eNB when the grant is sent and another by the UE. Failure of either of the LBT operations leads to no transmission attempt. In a situation when the eNB is able to indicate the resource grant to the UE, i.e., the UE is granted a subframe for uplink transmission, the UE might still not be able to access the medium due to its unsuccessful LBT process.

To reduce the likelihood that the allocated uplink subframe is not wasted from the perspective of the radio access network (e.g. the LTE cell) owing to the possibility of not having data to transmit or an unsuccessful LBT process at a particular station (e.g., a UE), the same resource 302 is assigned to multiple stations (e.g., UEs).

The stations (e.g., UEs) can be assigned different priorities for utilizing the granted resources 302 in the steps 204 and 206. The priority can be set based on their traffic priority level or based on a weighting metric (e.g., the utility function as described below). The stations contend in the step 204 accordingly for the resource 302.

Based on the priority level, each contending station is assigned a different backoff (BO) window size (e.g., as part of the allocating step 202), so that a station with a higher priority has higher chances to access the wireless channel at an earlier instant compared to stations having a lower priority in the step 204. A user with lower priority can still have a chance to utilize the subframe upon the completion of its backoff operation if all stations with higher priority do not complete the backoff or do not have any or enough data to be transmitted.

Figure 4:
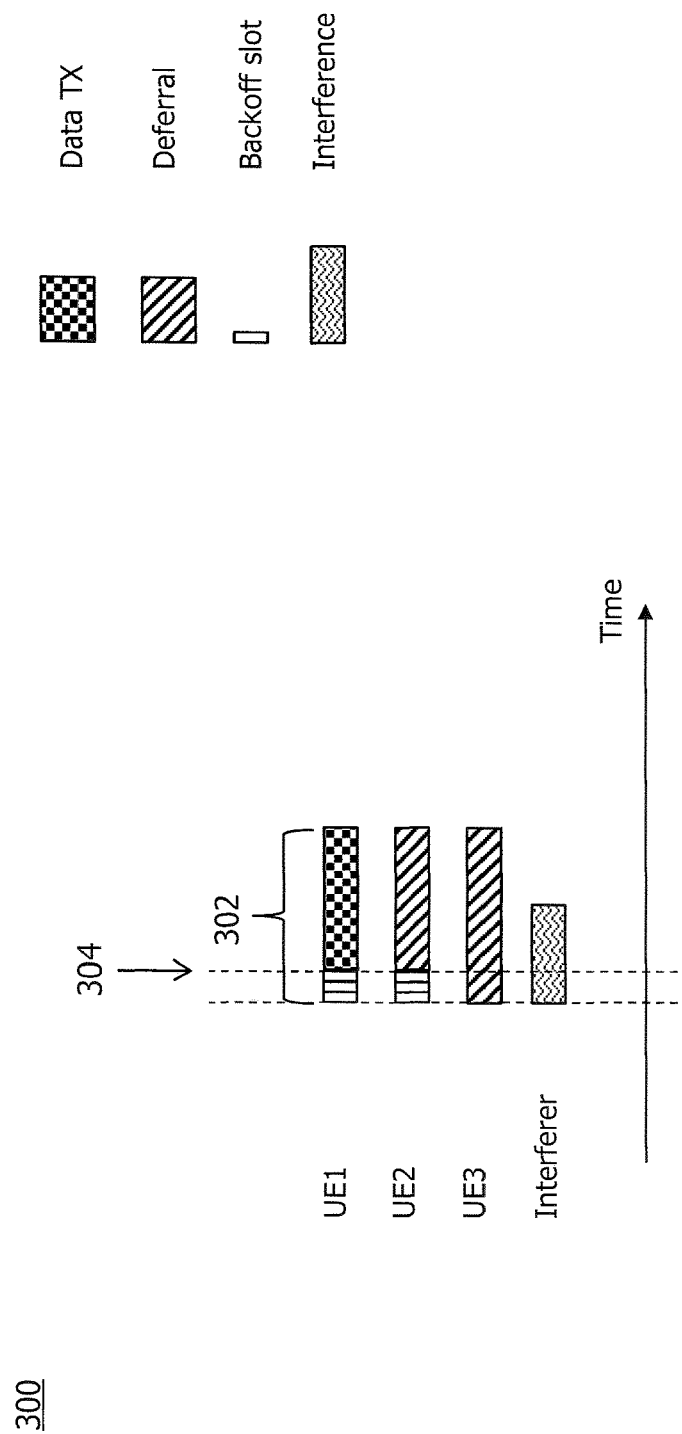
FIG. 4 shows a second example for an allocation of resources.

FIG. 4 shows a second example for an allocation 300 of resources 302. The allocation 300 illustrated in FIG. 4 is an example for UEs being assigned different priorities affecting their contention for the granted resources 302 in the step

204. In this non-limiting example, UEs contend for the same set of resources 302. For example, three UEs ($UE_1$, $UE_2$ and $UE_3$) are assigned the same resource blocks (RBs).

The eNB generates different random numbers for different UEs to assign the priorities (e.g., $BO_1=3, BO_2=5, BO_3=1$ for $UE_1, UE_2$ and $UE_3$, respectively). The $UE_3$ is blocked by an interferer, so it cannot start decrementing its BO counter. $UE_2$ and $UE_3$ do not receive any interference and start decrementing the BO counter. Since $UE_1$ is assigned a smaller initial value for its BO counter, $UE_1$ is able to finish the BO mechanism earlier than $UE_2$ at reference sign 304 in the step 204 and start its UL transmission in the step 206. Given that $UE_2$ receives the energy of the transmission from $UE_1$, it is required to freeze the remaining BO counter and defer its transmission.

The allocation of UL resources on the wireless channel may depend on the channel state, e.g., for high load conditions. By frequency-multiplexing the multiple stations (e.g., UEs) at high load, large delays for being able to serve a certain station can be avoided. Frequency-multiplexing of the UEs may encompass that different UEs are assigned different sub-portions of the spectrum of the wireless channel at a given time.

The UEs served by the same serving eNB do not necessarily observe the same interference situation. If the multiplexed users do not finish their LBT process 204 at the same time 304, users with unfinished backoff defer their transmission if they are in the coverage range of the one or more UEs that finish their backoff and started their transmission. In the frequency-multiplex case, the resources that are allocated to the deferred UEs are conventionally unutilized from the point of view of the radio access network (e.g., an LTE cell). In order to increase channel efficiency, a contention according to the step 204 is applied.

For example, multiple stations are assigned the same sub-portion of the spectrum of the wireless channel. Based on the priority level or another weighting metric (such as below utility function), the stations (e.g., UEs or nodes with UL data for the access network) contend accordingly for the resource. By virtue of the step 204, there is a higher probability that the resources are not left unused.

A decision criterion for channel access based on a utility function is described. The decision of using an SPS configuration and/or switching to the LTE schedule-based access may take into account multiple factors in unlicensed spectrum. Unlike licensed spectrum, the stations (e.g., the base station) have to take into account the availability of the wireless channel, interference levels, reliability of the channel besides the traffic load conditions, in order to determine whether the SPS configuration or LTE schedule-based channel access scheme is used for the resource allocation.

The base station (e.g., an eNB) may employ a learning scheme to estimate the traffic load build-up based on the past Buffer Status Reports (BSRs) for taking the decision on resource assignment. Accordingly, more resources are allocated to UEs with higher traffic demands. Herein, allocating more resources may include more assigned resources, a more fine-grained periodicity of the allocated resource, a higher duty factor of allocated resources and/or a greater duration of the allocated resource.

As the number of collisions increases, utilization of the available resources starts to ramp up and, accordingly, one or more BSRs indicate a more loaded condition. In this case, the eNB gradually adapts its behavior from contention-based access towards schedule-based access. The adaptive process is carried out by gradually reducing the number of resources that could potentially be utilized using contention-based access, and vice-versa.

FIG. 5 shows a flowchart for a method 500 of adaptively allocating resources, e.g., by conditionally performing schedule-based access. The method may be performed by a base station (e.g., an eNB) for uplink resource allocation on the wireless channel. In order to take the decision on the uplink allocation in the step 202, a decision regime is divided into three main parts (illustrated in FIG. 5 as leading to an allocation in the Steps (4), (6) and (7), respectively).

The decision is based on a utility function W. The utility function may cumulate multiple factors or parameters. The utility function depends on different factors or parameters, for instance, channel quality and spectral interference levels, a reliability index or a number of collisions, resource utilization, etc.

In an embodiment, the three regions illustrated in FIG. 5 are not based exclusively on the traffic loads. The utility function takes into account other factors. As an example, a low traffic condition combined with a highly interfering channel (e.g., heavy traffic for collocated network) leads to the use of dynamic scheduling in LTE in order to avoid that resources are forgone in an SPS allocation. In this way, the UE having data accesses the wireless channel upon successful LBT processes. This may also help in avoiding a situation that the eNB determines that a particular UE does not have data in the assigned resource when the actual reason is that the UE is unable to transmit because of unsuccessful LBT.

The three regimes are identified based on configurable thresholds, thr1 and thr2. The first threshold, thr1, is a configurable threshold of the radio access network.

A value of the utility function W that is smaller than the first threshold indicates that there is very little traffic offered in the network, resource utilization is low and/or the wireless channel is found clean, etc. In this case, the method 200 may be performed, wherein the allocation is not unique in that multiple resources 302 are assigned to the same station (which is also referred to as over-provisioning or over-booking of resources).

The second threshold, thr2, is a configurable threshold of the radio access network. A value of the utility function, W, that is smaller than the second threshold, thr2, but larger than the first threshold, thr1, may, e.g., indicate that there is low-to-medium traffic offered in the network and/or resource utilization is low-to-medium, etc. The dependencies and/or technical meaning of the utility function may be much broader, e.g., covering other factors too besides the traffic load. The utility function-driven allocation allows operators in real-world radio access networks to customize their configuration, and more effectively tailor the medium access to subjected traffic loads, traffic priority, number of nodes, reliability, interference levels, etc.

In this case, (e.g., depending upon the configurable threshold values), the eNB gradually starts to apply SPS in the allocating step 202 without over-provisioning the same shared resource to multiple UEs.

A value of the utility function, W, that is higher than the second threshold, thr2, indicates that there is medium-to-high traffic in the radio access network and/or resource utilization is medium-to-high, etc. In this case, the eNB starts to follow a TDMA schedule for allocating resources to the stations (e.g., the UEs or nodes). Alternatively or in addition, the eNB can apply the priority-based scheme for allowing the stations (e.g., the UEs) the access to the wireless channel, e.g., based on Quality of Service (QoS) traffic parameters.

The weighting function or utility function, W, may be define as follows.

$$W = w_1 \cdot P_1 + w_2 \cdot P_2 + w_3 \cdot P_3 + w_4 \cdot P_4 + \ldots + w_i \cdot P_i$$

Here, the dependencies, $P_1, P_2 \ldots P_i$, are the influencing factors or parameters and $w_1, w_2 \ldots w_i$, are their corresponding weights, e.g., indicating the importance of the parameters. The weights may be pre-determined at deployment, e.g., based on a network scenario for the specific radio access network and/or may be adapted during operation according to varying QoS requirements and/or channel conditions (or the channel state).

The values for the weighting factors are in the range [0, 1] and are normalized so that their sum equals to 1, $\Sigma_i w_i = 1$.

As non-limiting examples, the parameters, $P_i$, include one or more of the following dependencies. $P_1$ may be a parameter indicative of the inverse of the spectral interference (e.g., cleanliness) of the channel. The parameter $P_2$ may be indicative of the reliability index, such as a packet receive ratio. The parameter $P_3$ may be indicative of a utilization level of the resources (e.g., previously) allocated to the station or all stations in the radio access network or cell. The parameter $P_4$ may be indicative of the buffer status at stations (e.g., UEs or nodes) and the buffer build-up.

The decision on the allocation scheme (e.g., according to the method 500 in FIG. 5) may be repeated at predefined intervals, or may be adapted over time. Alternatively or in addition, the decision may be performed in an event-based fashion, e.g., upon arrival of new data, etc.

Based on the available parameters, the utility function W is calculated in Step (2). If the utility function, W, is below the lower first threshold, thr1, at branching point (3), the eNB exercises SPS in an over-provisioned fashion in the Step (4). That is, the same resource may be allocated to multiple UEs. This is justified as for instance the traffic in the network is very low.

If the value of the cumulative utility function, W, is higher than the first threshold, thr1, and lower than the second threshold, thr2, the eNB may use SPS without any or with reduced over-provisioning in the Step (6).

If the value of the utility function, W, is above the higher second threshold, thr2, at branching point (5), the eNB may apply a conventional scheduling-based allocation in the Step (7).

The LBT process may be performed according to the step 204 in each of the above-mentioned cases.

As an alternative to LBT-based channel access, a time-averaged transmit constraint may be fulfilled in the step 204, e.g., in extreme channel conditions. In heavily occupied channel conditions (e.g., caused by collocated networks) and/or when LTE has utilized the channel with a duty cycle of less than 10% observed over an interval of 50 ms, the eNB and/or the UEs may (e.g., according to the regulation EN 301.893 for Short Control Signaling Transmissions) send out control information, e.g., to notify a Signaling Gateway (SG), to transmit the BSR, to transmit Channel State Information (CSI), etc. without prior LBT requirements.

UL transmissions in extreme cases are discussed. In an example situation, the eNB has received one or more BSRs from a particular UE indicating a traffic build-up, and despite the fact that eNB has multiple times assigned resources to the UE, the UE has still been unable to transmit its data, e.g., due to unsuccessful LBTs in multiple attempts. The eNB is configured to assess this situation, e.g., as the eNB already knows that the particular UE has traffic (based on the BSRs) and it has not received data from the UE in the assigned resources multiple times. In this case, the eNB may be configured to take any of the following two steps. In the first optional step, the DL transmission is shortened. The remaining transmit opportunity (TXOP) interval is kept to allow (more) UL transmission by the particular UE. In the second optional step, the eNB increases the number of SPS resources and periodicity of resource assignment for that particular UE, e.g., in order to give the UE more often the opportunity to contend for the wireless channel and eventually access the channel to carry out its buffered data transmission.

Figure 6:
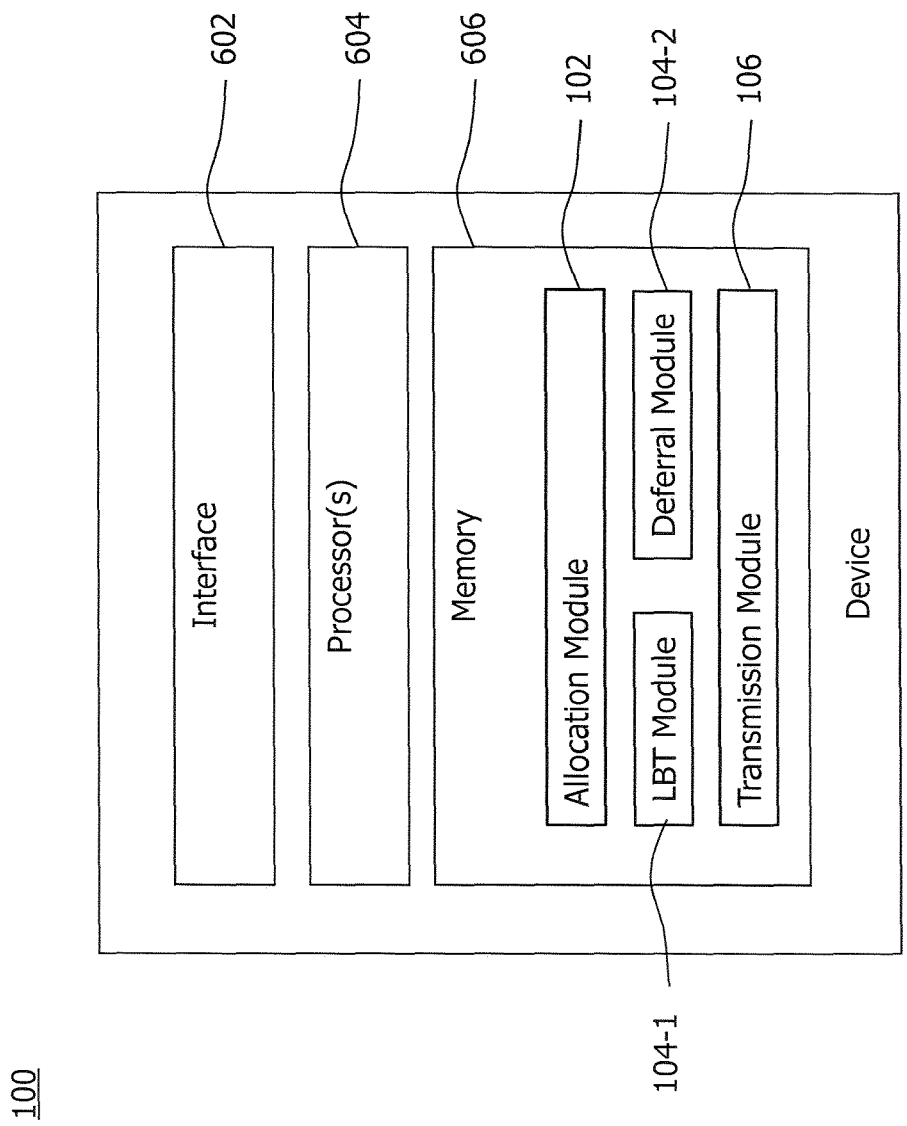
FIG. 6 shows a schematic block diagram for a second embodiment of a device for accessing a wireless channel by a station using an access technology in coexistence with the same or another access technology on the wireless channel.

FIG. 6 shows a second embodiment of the device 100, e.g., as implemented at the station performing the method 200. The device 100 comprises a radio interface 602 for transmitting and sensing energy on multiple carriers. The device 100 further comprises a processor 604 and memory 606 operatively coupled to the processor 604. The memory 606 is encoded with instructions that define functions according to the modules 102, 104 (e.g. 104-1 and/or 104-2) and 106.

The technique can be implemented to allow an LTE system operating in the unlicensed spectrum (and also in the license shared spectrum) to govern a flexible UL/DL allocation scheme, which optionally adapts itself based on traffic conditions or characteristics. The traffic condition or traffic characteristics may include periodic, aperiodic, volume, priority class for the data to be transmitted. Alternatively or in addition, the allocation may depend on the number of stations (e.g., UEs or terminals), a congestion in the radio access network and the availability of channel resources (e.g., spectrum interference levels).

In particular, an eNB may take measures to improve the UL efficiency for channel access in unlicensed and license shared spectrum. The method can be implemented to allow an LTE system to exercise a hybrid of schedule-based and contention-based channel access principles, e.g., depending upon the traffic conditions, the number of terminals, the congestion in the network and the availability of channel resources.

Independently or in combination with the allocation providing flexibility to the stations for successfully contending for the resources, a method 500 on how to identify one or more infliction points and two or more regimes to determine an appropriate allocation scheme, e.g., for different types of the medium access, is provided.

As has become apparent from above embodiments, the technique can be implemented to allow an LTE system to enhance its UL channel access in unlicensed and license shared spectrum. Moreover, UL latency at low load conditions can be reduced and the channel utilization for UL access can be increased.

The technique can be implemented to achieve a fair and efficient spectral coexistence with other networks and technologies. The LTE system can improve its throughput efficiency in lightly loaded traffic conditions, e.g., by differentiating traffic characteristics such as periodic, aperiodic, volume, priority class of data to be transmitted and/or when there is less congestion in the network.

Improved channel efficiency for LTE in the unlicensed spectrum, by implementing the technique, can also benefit and support spectral coexistence with other collocated networks, such as Wi-Fi and other LTE implementations in unlicensed spectrum (e.g., LTE-U, LAA and/or standalone LTE networks).

Furthermore, different types of UL access can be exercised depending upon a configurable criterion.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of accessing a wireless channel by a station using an access technology in coexistence with the same or another access technology on the wireless channel, the method comprising:
    allocating resources on the wireless channel or receiving an allocation therefor, the allocation of the resources being carried out according to a selection of one of three access schemes responsive to a utility function; wherein the utility function cumulates multiple different wireless operation factors or wireless operation parameters;
    performing a listen before talk (LBT) process on the wireless channel or deferring transmission to satisfy a time-averaged transmit constraint, if data to be transmitted by the station on the wireless channel is available; and
    transmitting the data by the station using at least one of the allocated resources on the wireless channel, if the LBT process indicates that the wireless channel is clear for the at least one allocated resource or if the time-averaged transmit constraint is satisfied for the at least one allocated resource;
    wherein the three access schemes comprise a scheduled resources access scheme, a pre-configured resources access scheme, and an overbooked resources access scheme.

2. The method of claim 1, wherein the resources include portions of the wireless channel distinguished by time and/or frequency and/or spatial stream.

3. The method of claim 1, wherein the allocation carried out according to the selection of one of the three access technologies responsive to the utility function comprises an allocation of the resources that is not uniquely associated with data to be transmitted by allocating multiple resources to the station.

4. The method of claim 3, wherein the multiple resources include multiple timeslots on the wireless channel and/or multiple frequency channels.

5. The method of claim 3, wherein the allocation of multiple resources comprises an allocation according to a semi-persistent schedule (SPS).

6. The method of claim 5, wherein a periodicity and/or a duration of the semi-persistent scheduled resources is equal to a transmission time interval of the access technology.

7. The method of claim 1, wherein each LBT process depends on a backoff counter, and wherein different or identical backoff counters are assigned to each of multiple stations responsive to a priority of the corresponding station.

8. The method of claim 1, wherein a number and/or a periodicity and/or a duration of the resources allocated to the station depends on a priority of the station and/or the utility function.

9. The method of claim 8, wherein the priority of the station depends on a buffer status report of the station.

10. The method of claim 8, wherein the utility function depends on an inverse of interference power on the wireless channel and/or a cleanliness of the wireless channel.

11. The method of claim 8, wherein the utility function depends on a reliability of the wireless channel and/or a packet reception ratio on the wireless channel.

12. The method of claim 8, wherein the utility function depends on a utilization level of the allocated resources on the wireless channel.

13. The method of claim 8, wherein the utility function depends on buffer status reports and/or a buffer build-up of multiple stations accessing the wireless channel according to the access technology.

14. The method of claim 8, wherein the same resources are allocated to multiple stations including the station if the utility function is below a first threshold.

15. The method of claim 1, wherein the method is performed by a base station as the station, and the allocating the resources on the wireless channel or receiving the allocation therefore comprises allocating the resources by sending a downlink scheduling assignment.

16. The method of claim 1, wherein the method is performed by a wireless station as the station, and the allocating the resources on the wireless channel or receiving the allocation therefore comprises receiving the allocation by receiving an uplink schedule grant.

17. The method of claim 1, wherein the method is performed by each of a base station implementing the access technology and a wireless station implementing the access technology, wherein allocating the resources on the wireless channel or receiving the allocation therefore comprises the base station allocating the resources and the wireless station receiving the allocation.

18. The method of claim 1, wherein each LBT process for the overbooked resources access scheme depends on a backoff counter assigned to each of multiple stations responsive to a priority of the corresponding station, wherein shorter backoff counters are assigned to higher priority stations.

19. The method of claim 1, wherein the utility function takes into account a plurality of parameters associated with the wireless channel.

20. The method of claim 1, wherein the utility function comprises a threshold-based function, wherein the allocation of the resources comprises the selection of one of the three access schemes responsive to an evaluation of the utility function relative to at least two thresholds.

21. The method of claim 1, wherein the allocation carried out according to the selection of one of the three access technologies responsive to the utility function comprises an allocation of the resources that is not uniquely associated with data to be transmitted by allocating the same resources to multiple stations including the station.

22. A non-transitory computer readable medium storing a computer program product for controlling one or more computing devices, the computer program product comprising software instructions which, when run on one or more processing circuits on the one or more computing devices, causes the one or more computing devices to:
    allocate resources on the wireless channel or receiving an allocation therefor, wherein the allocation of the resources being carried out according to a selection of one of three access schemes responsive to a utility function; wherein the utility function cumulates multiple different wireless operation factors or wireless operation parameters;

perform a listen before talk (LBT) process on the wireless channel or deferring transmission to satisfy a time-averaged transmit constraint, if data to be transmitted by the station on the wireless channel is available; and transmit the data by the station using at least one of the allocated resources on the wireless channel, if the LBT process indicates that the wireless channel is clear for the at least one allocated resource or if the time-averaged transmit constraint is satisfied for the at least one allocated resource;

wherein the three access schemes comprise a scheduled resources access scheme, a pre-configured resources access scheme, and an overbooked resources access scheme.

23. A base station connected or connectable to a backhaul network of an access network using an access technology in coexistence with the same or another access technology on a wireless channel, the base station comprising:

an allocation circuit configured to allocate resources on the wireless channel, wherein the allocation circuit carries out the resource allocation by selecting one of three access schemes responsive to a utility function; wherein the utility function cumulates multiple different wireless operation factors or wireless operation parameters;

an LBT circuit configured to perform a listen before talk (LBT) process on the wireless channel and/or a deferral module for deferring transmission to satisfy a time-averaged transmit constraint, if data to be transmitted by the station on the wireless channel is available; and a transmission circuit configured to transmit the data by the station using at least one of the allocated resources on the wireless channel, if the LBT process indicates that the wireless channel is clear for the at least one allocated resource or if the time-averaged transmit constraint is satisfied for the at least one allocated resource;

wherein the three access schemes comprise a scheduled resources access scheme, a pre-configured resources access scheme, and an overbooked resources access scheme.

24. A wireless station wirelessly connected or connectable to an access network according to an access technology in coexistence with the same or another access technology on a wireless channel, the wireless station comprising:

an allocation circuit configured to receive an allocation of resources on the wireless channel, wherein the allocation circuit carries out the resource allocation by selecting one of three access schemes responsive to a utility function; wherein the utility function cumulates multiple different wireless operation factors or wireless operation parameters;

an LBT circuit configured to perform a listen before talk (LBT) process on the wireless channel and/or a deferral module for deferring transmission to satisfy a time-averaged transmit constraint, if data to be transmitted by the station on the wireless channel is available; and a transmission circuit configured to transmit the data by the station using at least one of the allocated resources on the wireless channel, if the LBT process indicates that the wireless channel is clear for the at least one allocated resource or if the time-averaged transmit constraint is satisfied for the at least one allocated resource;

wherein the three access schemes comprise scheduled resources access scheme, a pre-configured resources access scheme, and an overbooked resources access scheme.

* * * * *